United States Patent
Iriguchi et al.

(10) Patent No.: US 10,191,477 B2
(45) Date of Patent: Jan. 29, 2019

(54) SYSTEM AND METHOD FOR MODIFICATION MANAGEMENT OF A CONFIGURATION SYSTEM

(71) Applicant: YOKOGAWA ELECTRIC CORPORATION, Musashino-shi, Tokyo (JP)

(72) Inventors: Hiroshi Iriguchi, Singapore (SG); Alexander Yap, Singapore (SG); Ka Wai Kathy Chu, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 465 days.

(21) Appl. No.: 14/927,866

(22) Filed: Oct. 30, 2015

(65) Prior Publication Data

US 2017/0123410 A1 May 4, 2017

(51) Int. Cl.
*G05B 15/02* (2006.01)
*G05B 19/418* (2006.01)
*G06F 17/30* (2006.01)
*G06F 9/445* (2018.01)

(52) U.S. Cl.
CPC . *G05B 19/41835* (2013.01); *G05B 19/41845* (2013.01); *G06F 9/44505* (2013.01); *G06F 17/30106* (2013.01); *G05B 2219/31229* (2013.01); *G05B 2219/31418* (2013.01); *Y02P 90/16* (2015.11)

(58) Field of Classification Search
CPC .... G05B 19/41845; G05B 2219/31418; G05B 2219/31229; G06F 17/30106

USPC ............................................. 700/9; 707/695
See application file for complete search history.

(56) References Cited

U.S. PATENT DOCUMENTS

| | | | | |
|---|---|---|---|---|
| 4,827,423 | A * | 5/1989 | Beasley | G01N 29/2493 700/100 |
| 6,694,336 | B1 * | 2/2004 | Multer | G06F 17/30194 |
| 6,754,885 | B1 | 6/2004 | Dardinski et al. | |
| 7,089,270 | B2 * | 8/2006 | Ren | G06F 8/68 707/695 |
| 7,788,237 | B2 * | 8/2010 | Voronov | G06F 17/24 707/695 |
| 7,792,930 | B1 * | 9/2010 | Zhang | H04L 41/082 709/220 |
| 8,498,965 | B1 * | 7/2013 | Ren | G06F 8/68 707/625 |
| 9,098,513 | B1 * | 8/2015 | Ren | G06F 17/30067 |
| 9,471,575 | B2 * | 10/2016 | Cullen | G06F 8/65 |
| 9,514,439 | B2 * | 12/2016 | Marci | G06Q 10/10 |
| 9,851,712 | B2 * | 12/2017 | Kambe | G05B 19/41845 |
| 2004/0260734 | A1 * | 12/2004 | Ren | G06F 8/68 |

(Continued)

*Primary Examiner* — Viet Q Nguyen
(74) *Attorney, Agent, or Firm* — Sughrue Mion, PLLC

(57) ABSTRACT

A modification management system for a configuration system, includes, not limited to a comparator, a record generator and a link generator implemented in one or more processors. The comparator is configured to determine if a first modification item in a first instruction file is modified. The record generator is configured to create a first record and to store the first modification item in a first record when the first modification item is determined, by the comparator, to be modified. The link generator configured to generate a first link between the first record and the first instruction file, wherein the first instruction file is configured to define at least one modification item for the configuration system.

12 Claims, 6 Drawing Sheets

(56) References Cited

U.S. PATENT DOCUMENTS

| | | | |
|---|---|---|---|
| 2008/0040401 A1* | 2/2008 | Reinsch | G06F 8/68 |
| 2008/0065703 A1* | 3/2008 | Wang | G06F 1/3203 |
| 2009/0024674 A1* | 1/2009 | Gallagher | G06F 17/2288 |
| 2014/0228996 A1* | 8/2014 | Owens | G05B 19/401 |
| | | | 700/114 |
| 2014/0293147 A1* | 10/2014 | Tang | G06F 3/044 |
| | | | 349/12 |
| 2014/0337278 A1* | 11/2014 | Barton | G06F 17/3023 |
| | | | 707/608 |
| 2014/0351387 A1* | 11/2014 | Abe | H04L 67/1097 |
| | | | 709/219 |
| 2015/0033216 A1* | 1/2015 | Appadurai | G06F 8/67 |
| | | | 717/169 |
| 2015/0089480 A1* | 3/2015 | Mukai | G06F 11/3624 |
| | | | 717/124 |
| 2016/0149953 A1* | 5/2016 | Hidayat | H04L 63/20 |
| | | | 726/1 |
| 2016/0294796 A1* | 10/2016 | Hidayat | H04L 63/08 |
| 2016/0335278 A1* | 11/2016 | Tabaaloute | G06F 17/30088 |
| 2017/0308568 A1* | 10/2017 | Laethem | G06F 17/30377 |

* cited by examiner

SYSTEM AND METHOD FOR MODIFICATION MANAGEMENT OF A CONFIGURATION SYSTEM

TECHNICAL FIELD

The disclosure generally relates to a field of industrial automation for an industrial plant. In particular, the disclosure relates to a modification system which may be used for one or more configuration systems of an industrial plant.

BACKGROUND

An industrial automation system, which is used for an industrial process plant, includes different types of systems. The different types systems are for different purposes and there may be more than one system for each type. Examples of those purposes are process control and safety control. Each type of the systems may be configured or set up in an engineering phase, then used in an operation phase and updated in a maintenance phase.

At each phase, engineering, operation and maintenance, each system may have separate tool and database. The tool may include, but not limited to, a computing device installed with a software and used to complete task in each phase. In an example, a configuration software is a tool which is used to complete a task to define a control logic for a controller in the plant.

A user need to find use each separate tool to identify a history of changes for a hardware component, such a field device or equipment, when there is a problem with the hardware component. From the identified history of changes, the user can trace the changes in the history to solve the problem.

In a typical plant, a first engineer submits a change request for approval before the change is performed. The change may include, not limited to, allocating an identification tag to a hardware component, define parameters in a control logic. A second engineer performs the change when the approval has been given for the change request. A third engineer then checks the system to confirm that the change has been completed.

A lot of manual efforts and logistics are needed to keep records of change requests and completion of the change requests. More manual effort and time are need to check and determine if the change requests have been completed. In one change request, there may be a plurality of modification items, changes which are required. This is especially for an industrial automation system which includes, not limited to, a complex network of components. Each component may have a plurality of parameters and corresponding values.

SUMMARY

A modification management system for a configuration system, includes, not limited to a comparator, a record generator and a link generator implemented in one or more processors. The comparator is configured to determine if a first modification item in a first instruction file is modified. The record generator is configured to create a first record and to store the first modification item in a first record when the first modification item is determined, by the comparator, to be modified. The link generator configured to generate a first link between the first record and the first instruction file, wherein the first instruction file is configured to define at least one modification item for the configuration system.

DETAILED DESCRIPTIONS

Figure 1:
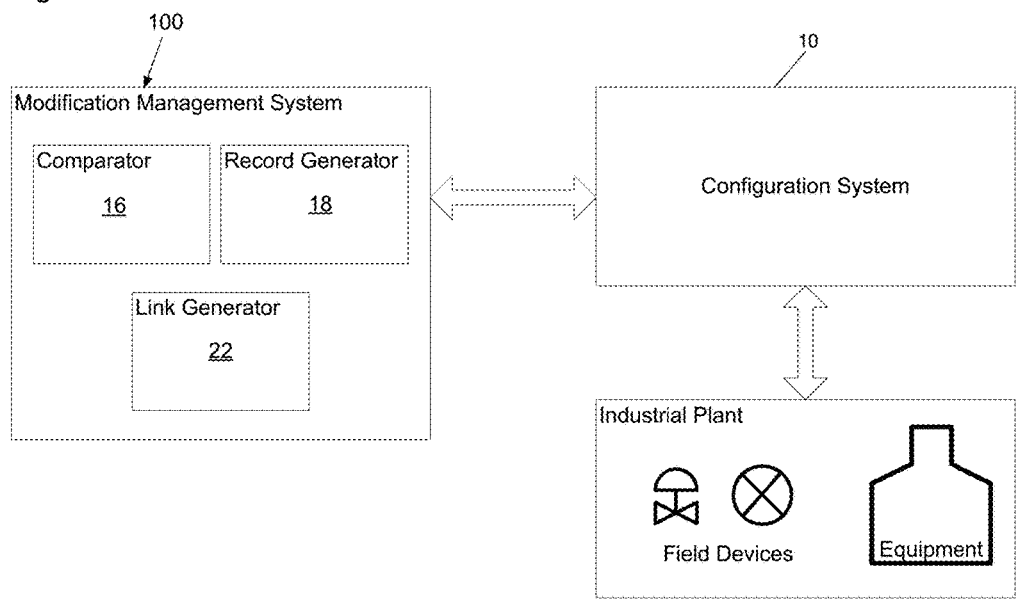
FIG. 1 is a block diagram of an overview of a modification management system for a configuration system of an industrial plant according to some embodiments of the invention.

FIG. 1 illustrates a modification management system 100 for a configuration system 10 of an industrial plant. The configuration system 10 may include, but not limited to, a plurality of configuration systems 10 for different types of systems used in the industrial plant. The different types of systems are used for different purposes in the plant. The plant includes, not limited to hardware, field devices and equipment, used for one or more industrial processes.

Figure 2:
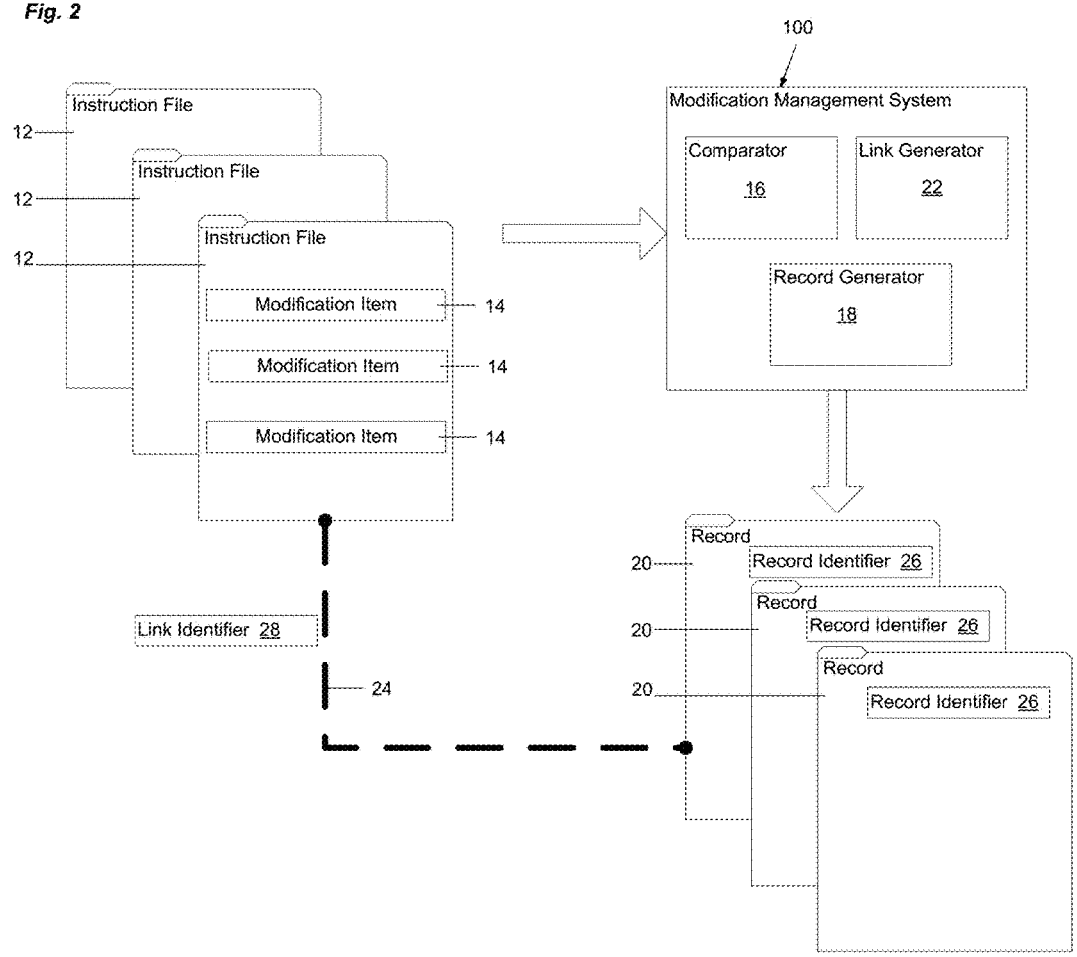
FIG. 2 is a diagram of a modification management system according to some embodiments of the invention.

An instruction file 12 is provided to the modification management system 100 in FIG. 2. The instruction file 12 may include, but not limited to, a modification item 14. The modification item 14 is related to the configuration system 10. A comparator 16 is configured to determine if the modification item 14 being modified. A record generator 18 is configured to create a record 20 and store the modification item 14 in the record 20 when the modification item 14 is determined to be modified. A link generator 22 is configured to generate a link 24 between the record 20 and the instruction file 12 when the modification item 14 has been modified.

A modification item 14 defines a modification which is required for a configuration system. The modification may be a result of change in design or specifications of the plant. A change in component, equipment or field device or process conditions may require a modification. The modification is required to maintain and update the configuration system. This is to ensure that the plant is updated and operational according to an updated design or specifications.

Figure 3:
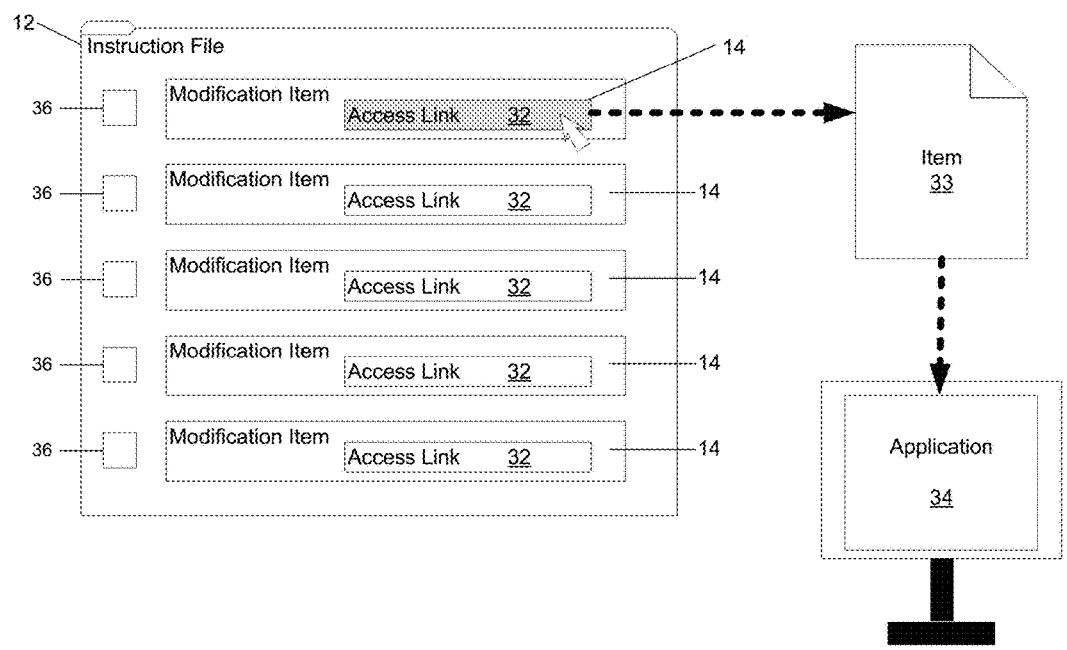
FIG. 3 is an illustration of an application being activated when an access link is selected according to some embodiments of the invention.

The modification item 14 in FIG. 3 may include, but not limited to, an access link 32 to access an item 33 using a tool 34 such as an application. For an item 33 which is related to parameters of a plant configuration, the application is an editor. For an item 33 which is related to a user manual, the application is a word processor for the user manual. The item 33 is a file which may include, but not limited to, configuration data and information. An example of information is description in a user manual related to the configuration system. The application 34 is activated and the item 33 is accessed when the modification management system 100 receives a user input to select the access link 32. The user can view or edit the item 33 using the application when the application is activated.

The modification management system 100 receives user input to check-out the instruction file 12 at a check-out event. The instruction file 12 which is in a check-out state is disabled for editing to add or change the modification item 14. In the check-out state, the user modifies the modification item 14. The modification item 14 is modified when the user selects an access link 32.

The modification system 100 receives a user input to check-in the instruction file 12 at a check-in event.

The comparator 16 is configured to determine if the modification item 14 being modified when the instruction file 12 is in a check-in state. The comparator 16 reads the modification item 14 at the check-in state and at the check-out state. Then the comparator 16 compares if the modification item 14 is different at the check-in state and at the check-out state. Finally, the comparator 16 determines the modification item 14 has been modified when the modification item 14 at the check-out state is different at the check-in state.

The record generator 18 is configured to create a new record 20 when the comparator determines that the modification item 14 has been modified. The modification item 14 being modified is stored to the record 20. The record 20 has the modification item 14 being modified in a period between the check-out event and the check-in event.

The link generator 22 then generates the link 24 between the record 20 and the instruction file 12. The link 24 is a relationship indicator which indicates that there record 20 is related to the instruction file 12.

An instruction file 12 is provided to the modification management system 100. The instruction file 12 may include, but not limited to, a plurality modification items 14. The plurality of modification items 14 is related to the configuration system 10. A comparator 16 is configured to determine if the plurality of modification items 14 being modified. A record generator 18 is configured to create a record 20 and store the plurality of modification items 14 when the plurality of the modification items 14 being determined to be modified. A link generator 22 is configured to generate a link 24 between the record 20 and the instruction file 12 when the plurality of modification items 14 being modified.

A modification item 14 is a definition of a modification for the configuration system 10. The modification may be a result of change in design or specifications of the plant. A change in component, equipment or field device or process conditions may require a modification. The modification is required to maintain and update the configuration system. This is to ensure that the plant is updated and operational according to an updated design or specifications.

Each of the plurality of modification items 14 may include, but not limited to, an access link 32 to access an item 33 using a tool 34, such as an application. The item 33 is a folder which may include, but not limited to, configuration data and information. An example of information is description in a user manual related to the configuration system. The application 34 is activated and the item 33 is accessed when the management system 100 receives a user input to select the access link 32. The user can view or edit the item 33 using the application when the application is activated.

The modification management system 100 receives user input to check-out the instruction file 12 at a check-out event. The instruction file 12 which is in a check-out state is disabled for editing to add or change the plurality of modification items 14. In the check-out state, the user modifies the plurality of modification items 14. Each of the plurality of modification items 14 is modified when the user selects an access link 32.

The modification system 100 receives a user input to check-in the instruction file 12 at a check-in event. An additional user input is received to check-in at least of the plurality of modification items 14.

The comparator 16 is configured to determine if the each of the plurality of modification items 14 being modified when the instruction file 12 is in a check-in state. For each of the plurality of modification items 14, the comparator 16 reads the modification item 14 at the check-in state and at the check-out state. Then the comparator 16 compares if the modification item 14 is different at the check-in state and at the check-out state. Finally, the comparator 16 determines the modification item 14 has been modified when the modification item 14 at the check-out state is different at the check-in state.

The record generator 18 is configured to create a new record 20 when the comparator determines that at least of the plurality of modification items 14 being modified. The at least of the plurality of modification items 14 being modified are stored to the record 20. The record 20 has at least of the plurality of modification items 14 being modified in a period between the check-out event and the check-in event.

The link generator 22 is configured to identify the instruction file 12 of the plurality of modification items 14. The link generator 22 then generates the link 24 between the record 20 and the instruction file 12. The link 24 is a relationship indicator which indicates that there record 20 is related to the instruction file 12.

Figure 4:
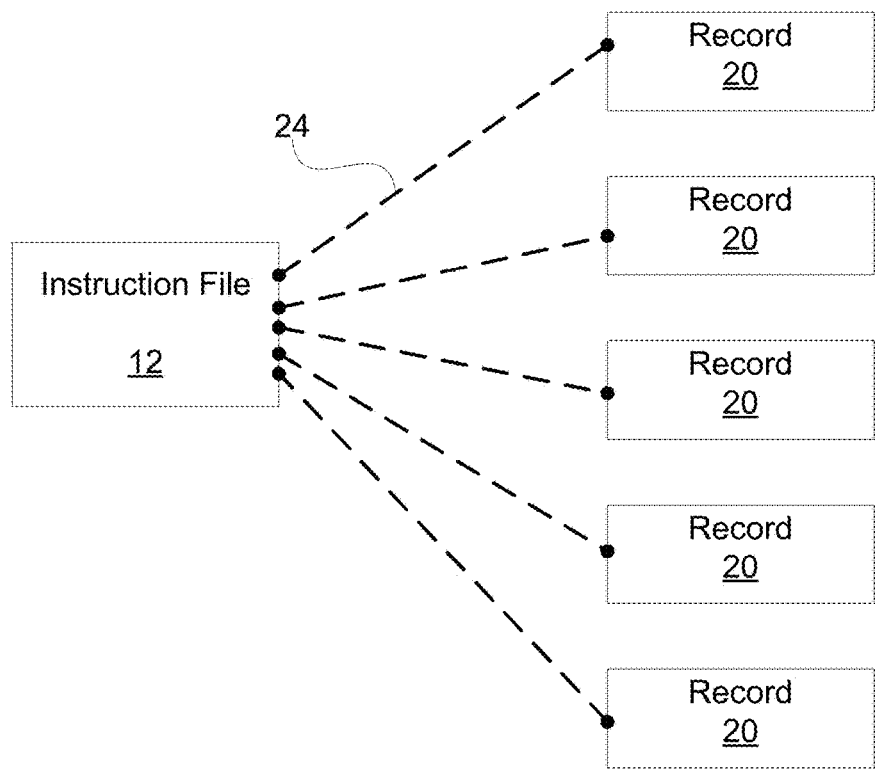
FIG. 4 is an illustration of a plurality of links being generated according to some embodiments of the invention.
Figure 5:
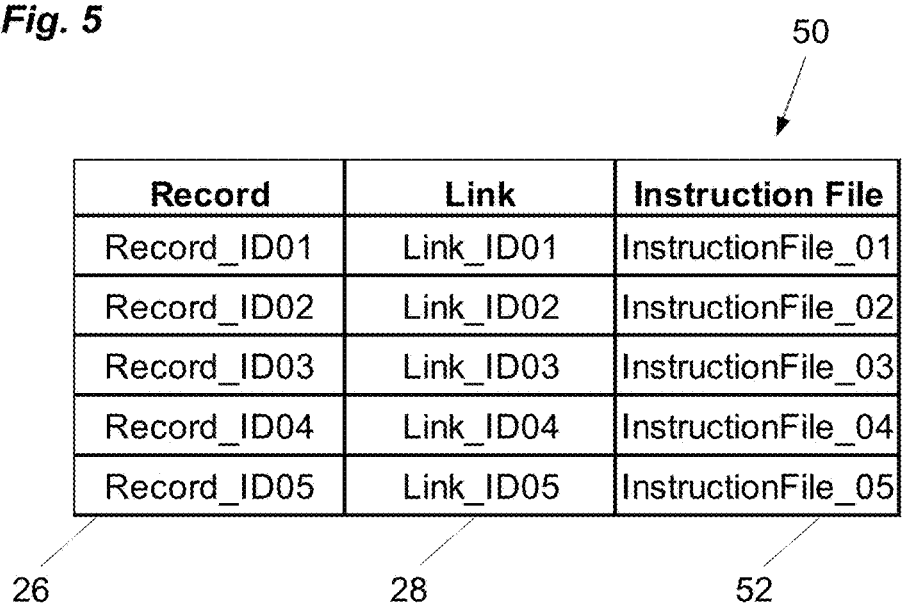
FIG. 5 is a table of records, links and instruction files according to some embodiments of the invention.

The instruction file 12 has a plurality of check-out events and check-in events when the instruction file 12 is modified at a plurality of periods. The plurality of modification items 14 in the instruction file 12 are modified during periods of the different check-in and check-out instances. FIG. 4 illustrates a plurality of records 20 and links 24 being generated, each record 20 for each period and each link 24 is between the instruction file 12 and one of the plurality of records 20.

According to another embodiment of the invention, the instruction file 12 may include, but not limited to, a plurality of instruction files 12. Each of the plurality of instruction files 12 has a plurality of modification items 14. Each of the modification item 14 may include, but not limited to, an access link 32 to access an item 33 using a tool 34, such as an application. The item 33 is a folder which may include, but not limited to, configuration data and information. An example of information is description in a user manual related to the configuration system. The application 34 is activated and the item 33 is accessed when the management system 100 receives a user input. The user can view or edit the item 33 using the application when the application is activated.

At a check-out event, user input is received to check-out at least one of the plurality of instructions files 12. The plurality of instruction files 12 is provided to the display in a list. A user input is received to determine the at least one of the plurality of instruction files 12 being check-out. The at least one of the plurality of instruction files 12 which is in a check-out state is disabled for editing to add or change the plurality of modification items 14. Additional user input is received to check-out at least one of the plurality of modification items 14 based on a predefined level of granularity.

In the check-out state, the user modifies the plurality of modification items 14. Each of the plurality of modification items 14 is modified when the user selects an access link 32.

The modification system 100 receives user input to check-in at least one of the plurality of instruction files 12 at a check-in event. Additional user input is received to check-in at least of the plurality of modification items 14 based on a predefined level of granularity.

A checkbox 36 is provided next to each of the plurality of instruction files 12 and each of the plurality of modification items 14. The user input is in a form of a check in the checkbox 36.

The comparator 16 is configured to determine if the each of the plurality of modification items 14 being modified when the at least one of the plurality of instruction files 12 and at least one of the plurality of modification items are in a check-in state. For each of the plurality of modification items 14 in the check-in state, the comparator 16 reads the modification item 14 at the check-in state and at the check-out state. Then the comparator 16 compares if the modification item 14 is different at the check-in state and at the check-out state. Finally, the comparator 16 determines the modification item 14 has been modified when the modification item 14 at the check-out state is different at the check-in state.

The record generator 18 is configured to create a new record 20 when the comparator determines that at least of the plurality of modification items 14 being modified. The at least of the plurality of modification items 14 being modified are stored to the record 20. The record 20 has at least one of the plurality of modification items 14 being modified in a period between the check-out event and the check-in event.

The link generator 22 is configured to identify the instruction file 12 of the plurality of modification items 14 in the record 20. The link generator 22 then generates the link 24 between the record 20 and the instruction file 12. The link 24 is a relationship indicator which indicates that there record 20 is related to the instruction file 12.

The instruction file 12 has a plurality of check-out events and check-in events when the instruction file 12 is modified at a plurality of periods. The plurality of modification items 14 in the instruction file 12 are modified during periods of the different check-in and check-out instances. There are a plurality of records 20 and links generated, each record for each period and each link is between the instruction file 12 and one of the plurality of records. A first check-in event is a first instance. The next check-in event, a second check-in event, is a second instance. The first instance and the second instance are different and separate events.

In an embodiment, a plurality of instruction files 12 are check-out and the record 20 includes a plurality of modification items 14 from the plurality of instruction files 12. The link generates a plurality of links 24, each link between the record 20 and each of the plurality of instruction files 12.

The instruction file 12 is being configured for the configuration system 10 by manual effort or using a computing device with a software. The instruction file may include, but not limited to, an identifier which is unique to the instruction file 12 according to an embodiment of the invention.

According to some embodiments of the invention, the record generator 18 generates an identifier 26 for the record 20 and an identifier 28 for the link 24.

The record 20 has a structure similar to the instruction file 12 according to some embodiments of the invention.

According to some embodiments of the invention, the record 20 includes not limited to, at least one of a user identifier, an occurrence of the check-in event and an identifier of the at least one instruction file. The occurrence of the check-in event includes at least a date and a time.

According to some embodiments of the invention, the record generator 18 registers a first check-out event when the first modification item is being check-out, registers a first check-in event when the first modification item is check-in. The record generator then compares the first modification item at the first check-in event and at the first check-out event to determine if the first modification item is modified.

The record generator 18 generates a table 50 according to some embodiments of the invention. The table may include, but not limited to, identifiers 26 of the plurality of the records 20, identifiers 28 of the associated links 24 and identifiers 52 of the associated instruction files 12.

According to some embodiments of the invention, at the check-in event, the link generator 22 is configured to determine if at least one of the plurality of modification items 14 which is being check-out is related to one modification item 14 in the record 20. Some modification items 14 are related to each other and this detects if related modification items 14 are not being check-in at the same check-in event. The link generator 22 generates a notification when the at least one of the plurality of modification items 14 is related to the one modification item 14 in the record and not being check-in. This alerts user that modification has not been completed.

Figure 6A:
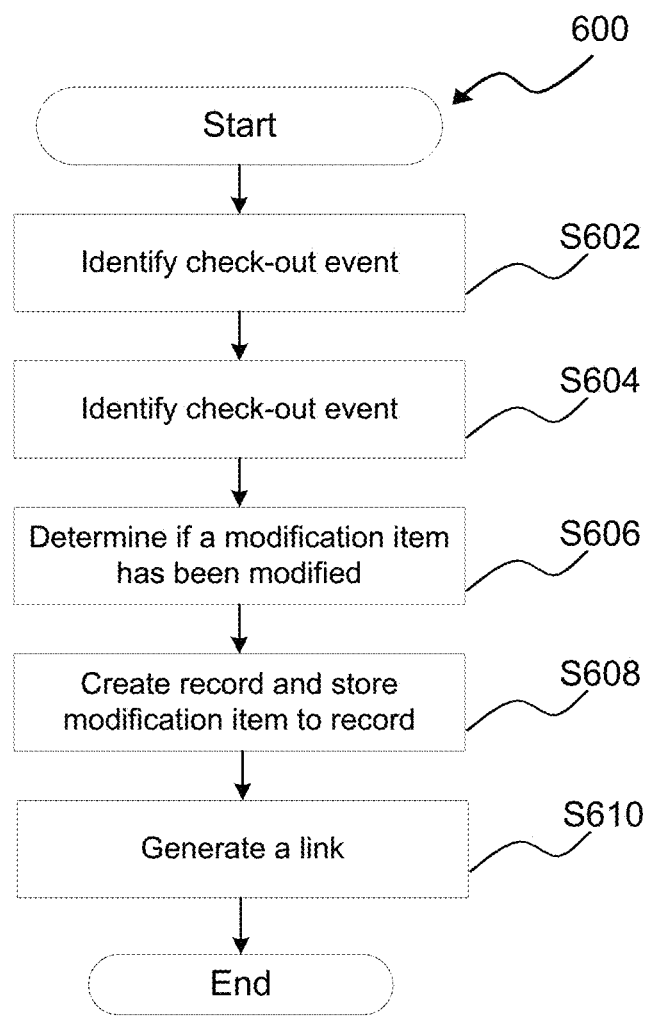
FIGS. 6A and 6B are workflows of the modification management system according to some embodiments of the invention.

FIG. 6A illustrates a workflow 600 of a method according to some embodiments of the invention.

In Step S602, the modification management system 100 identifies a check-out event at a first time instance. In Step S604, the modification management system 100 identifies a check-in event at a second time instance. In Step S606, the comparator 16 determines if each of a plurality of modification items 14 in an instruction file 12 has been modified. In Step S608, the generator 18 is configured to create a record 20 and stores the modification item 14 determines if each of the plurality of modification items 14 has been modified. In Step S610, the link generator 22 is configured to generate a link 24 between the record 20 and the instruction file 20 when the each of the plurality of modification items 14 has been modified.

Figure 6B:
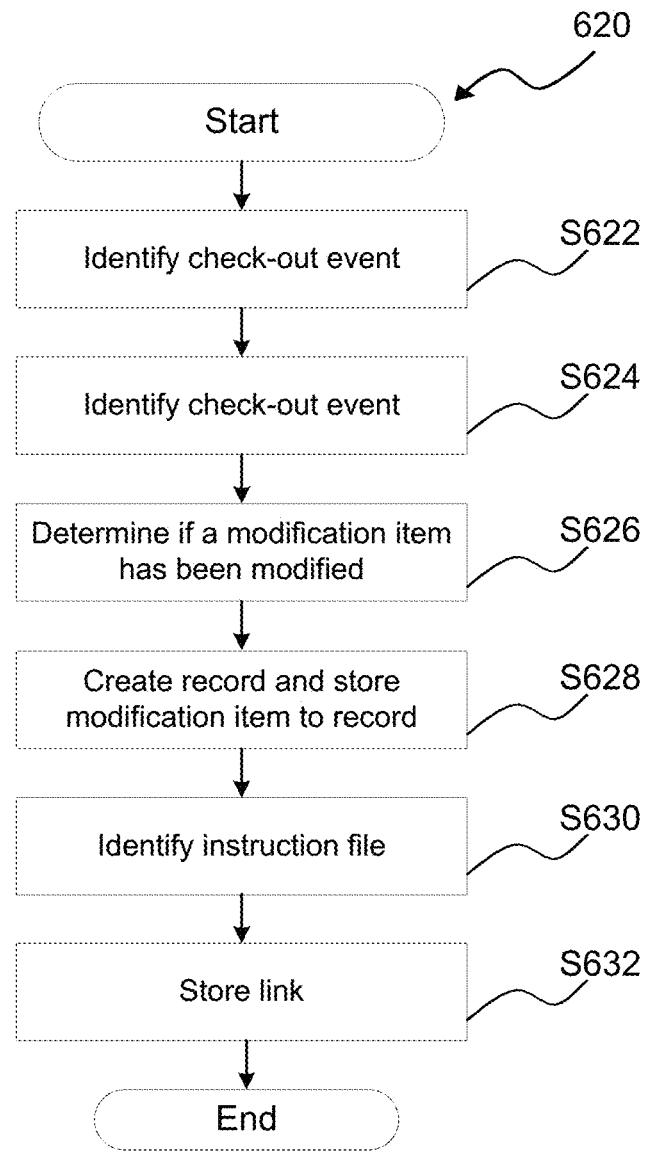

FIG. 6B illustrates a workflow 620 of a method according to some embodiments of the invention when there is a plurality of instruction files and each instruction file has a plurality of modification items. In Step S622, the modification management system 100 identifies a check-out event at a first time instance. In Step S624, the modification management system 100 identifies a check-in event at a second time instance. In Step S626, the comparator 16 determines if each of a plurality of modification items 14 in an instruction file 12 has been modified. In Step S628, the record generator 18 is configured to create a record 20 and stores the modification item 14 determines if each of the plurality of modification items 14 has been modified. In Step S630, the link generator 22 is further configured to identify the instruction file for each of the plurality of modification items in the record 20. The link generator 22 generates a plurality of links 24 between the record 20 and each of the plurality of instruction files 20 when more than one instruction files has been identified.

Advantageously, the records 20 can be used to confirm if modification items 14 which are listed in an instruction file 12 have been completed. Efficiency, in terms of time and effort, which is required to identify or confirm modifications in a configuration system. Multiple modifications to a configuration system are easily traceable from the links 24 to identify the instruction files 12. Based on the instruction files 12, users can determine if the modification items 24 were modified correctly.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network.

The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A system comprising:
   a comparator configured to determine if a first modification item in a first instruction file is modified, and to determine if a second modification item in one of the first instruction file and a second instruction file is modified;
   a record generator configured to create a first record and to store the first modification item in the first record in response to the first modification item being determined, by the comparator, to be modified, and to create a second record and to store the second modification item in the second record when the second modification item is determined, by the comparator, to be modified, the second record being different from the first record; and a link generator configured to generate a first link between the first record and the first instruction file, and to generate a second link between the second record and one of the first instruction file and the second instruction file, wherein the first instruction file is configured to define at least one first modification item for a configuration system, and the second instruction file is configured to define at least one second modification item for the configuration system, and wherein the comparator, the record generator and the link generator are implemented by circuitry or one or more hardware processors with software components.

2. The system in claim 1, wherein the record generator is configured to create at least one of a first record identifier for the first record and a first link identifier for the first link.

3. The system in claim 1, wherein the link generator is configured to:
determine if there is a third modification item is related to the first modification item and not in the first record
generate a notification in response to the third modification item being determined to be related to the first modification item and not in the first record.

4. The system in claim 1, wherein the created first record comprises at least one of a user identifier, a date of the created first record and a file identifier of the at least one instruction file.

5. The system in claim 1, wherein:
the comparator is configured to:
register a first check-out event in response to the first modification item being checked-out;
register a first check-in event in response to the first modification item being checked-in; and
compare the first modification item at the first check-in event and at the first check-out event to determine if the first modification item is modified.

6. The system in claim 1, further comprising a table configured to store:
a record identifier of the record file;
an instruction file identifier of an associated instruction file; and
a link identifier of an associated link between the record and the instruction file.

7. A method comprising
determining if a first modification item in a first instruction file is modified;
determining if a second modification item in one of the first instruction file and a second instruction file is modified;
creating a first record and storing the first modification item in the first record in response to the first modification item being determined to be modified,
creating a second record and storing the second modification item in the second record in response to the second modification item being determined to be modified, the second record being different from the first record;
generating a first link between the first record and the first instruction file; and
generating a second link between the second record and one of the first instruction file and the second instruction file,
wherein the first instruction file is configured to define at least one first modification item for a configuration system, and the second instruction file is configured to define at least one second modification item for the configuration system.

8. The method in claim 7, further comprising at least one of creating a first record identifier for the first record and creating a first link identifier for the first link.

9. The method in claim 7, further comprising:
determining if a third modification item is related to the first modification item and not in the first record; and
generating a notification in response to the third modification item being determined to be related to the first modification item and not in the first record.

10. The method in claim 7, wherein the first record comprises at least one of a user identifier, a modification date and a file identifier for the first instruction file.

11. The method in claim 7, further comprising
registering a first check-out event in response to the first modification item being checked-out;
registering a first check-in event in response to the first modification item being checked-in; and
comparing the first modification item at the first check-in event and at the first check-out event to determine if the first modification item is modified.

12. A non-transitory computer readable medium that stores a computer program to be executed by a computer to perform operations comprising:
determining if a first modification item in a first instruction file is modified;
determining if a second modification item in one of the first instruction file and a second instruction file is modified; creating a first record and storing the first modification item in the first record in response to the first modification item being determined to be modified,
creating a second record and storing the second modification item in the second record in response to the second modification item being determined to be modified, the second record being different from the first record; and
generating a first link between the first record and the first instruction file, and generating a second link between the second record and one of the first instruction file and the second instruction file,
wherein the first instruction file is configured to define at least one first modification item for a configuration system, and the second instruction file is configured to define at least one second modification item for the configuration system.

* * * * *